Patented July 21, 1936

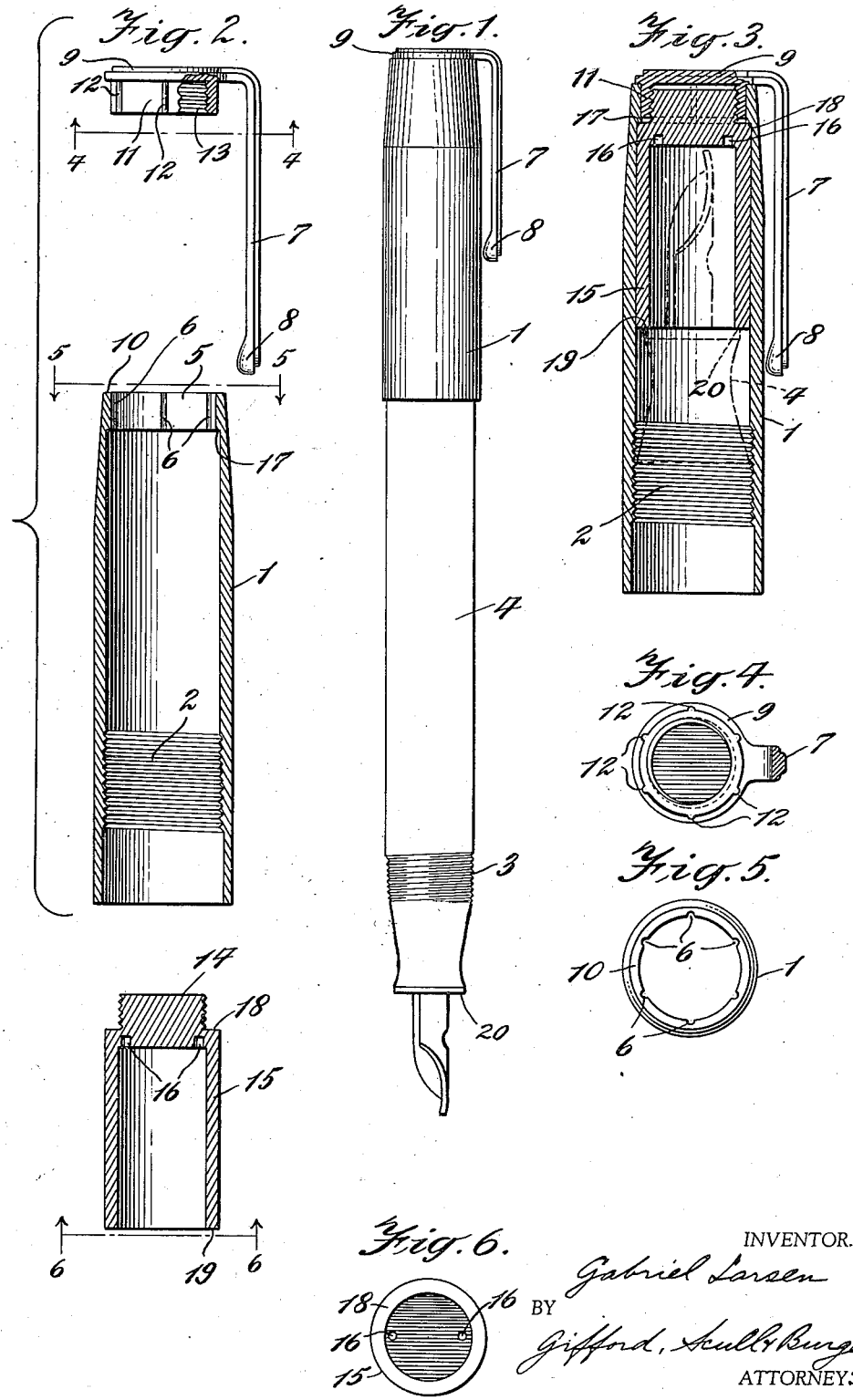

2,048,127

UNITED STATES PATENT OFFICE 2,048,127

FOUNTAIN PEN CAP AND CLIP

Gabriel Larsen, Springfield, N. J., assignor to L. E. Waterman Company, New York, N. Y., a corporation of New York Application January 10, 1935, Serial No. 1,092

15 Claims. (Cl. 24—11)

This invention relates to a novel and improved form of fountain pen cap and clip, the novel features of which will be best understood from the following description and the annexed drawing, in which I have shown a selected embodiment of the invention and in which:

Fig. 1 is a longitudinal view of a conventional fountain pen having my novel form of cap thereon when the pen is in use;

Fig. 2 is an exploded view of the different parts forming the cap and clip;

Fig. 3 is a view of the parts of Fig. 2 in their assembled position;

Fig. 4 is a view approximately on the line 4—4 of Fig. 2;

Fig. 5 is a view approximately on the line 5—5 of Fig. 2;

Fig. 6 is a view approximately on the line 6—6 of Fig. 2.

The cap is one which may be used in the ordinary way to cover the pen point when the pin is not in use and to be carried on the other end of the pen barrel when the pen is being used. The cap is shown as being formed of a length of tubing or tubular stock. The invention may be practiced either with that stock or by boring out a piece of material as is sometimes done in this art. Preferably, however, tubular stock is used as more economical, and my invention is particularly designed to be used in completing a cap made of tubing. In the drawing I have shown a section 1 of tubing and, as best shown in Fig. 2, this tubing is open at both ends and may be provided with the usual interior threads 2 for engagement with threads 3 on a pen 4.

One end of the tubing will remain open to receive the pen, and the other end, according to my invention, will be closed by the body of the clip. This may be done by providing the said other end of the tubing with a bore 5, here shown as cylindrical in form, and having on the inner fact of its surrounding wall a plurality of recesses 6. The clip is provided with the usual shank 7 and ball 8, the shank being preferably integrally secured to the body 9 of the clip. This body is of a shape and size to close the bore 5 and to rest upon the edges 10 of the wall surrounding the bore. The exact shape and size of the body will depend upon the design of the pen cap with which the invention is used.

In the illustrated embodiment, the clip is secured to the tubing by means of a neck 11 closely fitting within the bore 5 and having projections 12 adapted to be fitted within the recesses 6 so as to prevent rotation of the clip on the cap. In order to secure the clip in place I provide the neck with an internally threaded recess 13 to receive the extension 14 on the end of a sleeve 15 which is of such a size and shape as to fit closely within the cap. Either the sleeve or the clip may be made so that it may rotate in order to thread the two together. In this instance, as noted above, the clip is made non-rotatable because of the projections 12 engaging within the recesses 6, and therefore I make the interior of the cap cylindrical in form and make the sleeve of corresponding form. The end of the sleeve having the extension 14 thereon is provided with tool-engaging elements herein formed by the walls of a plurality of recesses 16. These recesses may receive the prongs of a spanner tool which may be inserted within the cap and used to turn the sleeve until the head of the clip is in tight engagement with the edge 10 of the bore 5.

It will of course be understood that the length of the extension 14 and also the depth of the recess are so designed that the clip body may thus come in contact with the edge 10 before or when the extension reaches the bottom of the threaded recess on the body. In order to insure that the body of the clip will continue to engage the edge 10, the wall of the cap may be provided with an inwardly extending peripheral shoulder 17 adapted to engage a peripheral shoulder 18 on the sleeve. The parts are so designed that these two shoulders will engage before the extension 14 reaches the bottom of the threaded recess 13, and thus the neck and consequently the body of the clip will be securely clamped between the edge 10 and the shoulder 17 of the cap.

The other end 19 of the sleeve forms a shoulder to engage the end 20 of the pen barrel when the pen is inserted within the cap. Therefore the sleeve performs this additional function as well as performing a means for securing the clip in place.

The above construction is one which has a number of advantages, most of which will be apparent to those skilled in the art. The clip may be placed at the extreme end of the cap, which is considered desirable in many instances, and not only does the body of the clip cover the end of the cap, but it likewise provides a plug for the cap end, thus actually completing the cap when the clip is fastened in place. For the sake of convenience in the claims, however, I shall refer to the cap as the tubular element 1 and shall refer to the clip and its body as elements separate from the cap.

The principal advantage of construction, as noted above, is that tubular stock may be used and the parts may be readily assembled and disassembled upon the occasion requiring it. Some of the other advantages are that a broken clip or cap can be replaced without requiring both a new cap and a new clip; that the clip may be more nearly lined up with the filling lever when used on a barrel having such a filling lever, no matter whether the threads 3 are formed of a single thread or what is commonly known as a 3-start or a 4-start thread; that the body 9 of the clip presents a sufficient amount of metal at the end or top of the cap for the engraving of initials or for the insertion of enameled emblems or the like.

While I have shown the invention as embodied in a specific form, it is to be understood that various changes in details may be made without departing from the scope of the invention, as defined by the appended claims.

I claim:

1. In combination, a pen cap open at one end to receive a pen and having a longitudinal bore at the other end, a clip having a body integral therewith and extending over said bore outside the cap and engaging the edges of said bore, a neck on said body extending into said bore, and means rigidly securing said neck within the bore.

2. In combination, a pen cap open at one end to receive a pen and having a longitudinal bore at the other end, a clip having a body integral therewith and extending over said bore outside the cap and engaging the edges of said bore, a neck on said body closely fitting the wall of said bore, and means securing the neck within the bore.

3. In combination, a pen cap open at one end to receive a pen and having a longitudinal bore at the other end, a clip having a body extending over said bore outside the cap and engaging the edges of said bore, a neck on said body extending into said bore, and means preventing longitudinal movement of the neck within the bore, said neck and the wall of said bore having projections and recesses fitting each other to prevent rotation of the neck within the bore.

4. In combination, a pen cap open at one end to receive a pen and having a longitudinal bore at the other end, a clip having a body extending over said bore outside the cap and engaging the edges of said bore, a neck on said body closely fitting the wall of said bore, and a sleeve within the barrel and having threaded engagement with said neck to hold the clip in place.

5. In combination, a pen cap open at one end to receive a pen and having a longitudinal bore at the other end, a clip having a body extending over said bore outside the cap and engaging the edges of said bore, a neck on said body closely fitting the wall of said bore, a sleeve within the barrel and having threaded engagement with said neck to hold the clip in place, and shoulders on said sleeve and on said cap adapted to engage each other to prevent movement of the clip body away from the cap.

6. In combination, a pen cap open at one end to receive a pen and having a longitudinal bore at the other end, a clip having a body extending over said bore outside the cap and engaging the edges of said bore, a neck on said body closely fitting the wall of said bore and having a recess with an interiorly threaded wall extending coaxially of the cap, and a sleeve slidably mounted within the cap and having a threaded end engaging said threaded wall of the recess to hold the clip in place.

7. In combination, a pen cap open at one end to receive a pen and having a longitudinal bore at the other end, a clip having a body extending over said bore outside the cap and engaging the edges of said bore, a neck on said body closely fitting the wall of said bore and having a recess with an interiorly threaded wall extending coaxially of the cap, a sleeve slidably mounted within the cap and having a threaded end engaging said threaded wall of the recess to hold the clip in place, and shoulders on said sleeve and on said cap adapted to engage each other to prevent movement of the clip body away from the cap.

8. In combination, a pen cap open at one end to receive a pen and having a longitudinal bore at the other end, a clip having a body extending over said bore outside the cap and engaging the edges of said bore, a neck on said body closely fitting the wall of said bore and having a recess with an interiorly threaded wall extending coaxially of the cap, a sleeve slidably mounted within the cap and having a closed end adjacent said clip, said end having a threaded extension adapted to engage said threaded wall of the recess to hold the clip in place, and tool-engaging elements on the inside of said closed end.

9. In combination, a pen cap open at one end to receive a pen and having a longitudinal bore at the other end, a clip having a body extending over said bore outside the cap and engaging the edges of said bore, a neck on said body closely fitting the wall of said bore and having a recess with an interiorly threaded wall extending coaxially of the cap, a sleeve slidably mounted within the cap and having a closed end adjacent said clip, said end having a threaded extension adapted to engage said threaded wall of the recess to hold the clip in place, tool-engaging elements on the inside of said closed end, and shoulders on said sleeve and on said cap adapted to engage each other to prevent movement of the clip body away from the cap.

10. In combination, a pen cap open at one end to receive a pen and having a longitudinal bore at the other end, a clip having a body extending over said bore outside the cap and engaging the edges of said bore, a neck on said body closely fitting the wall of said bore, and a sleeve within the barrel and having threaded engagement with said neck to hold the clip in place, said neck and the wall of said bore having projections and recesses fitting each other to prevent rotation of the neck within the bore.

11. In combination, a pen cap open at one end to receive a pen and having a longitudinal bore at the other end, a clip having a body extending over said bore outside the cap and engaging the edges of said bore, a neck on said body closely fitting the wall of said bore, a sleeve within the barrel and having threaded engagement with said neck to hold the clip in place, said neck and the wall of said bore having projections and recesses fitting each other to prevent rotation of the neck within the bore, and shoulders on said sleeve and on said cap adapted to engage each other to prevent movement of the clip body away from the cap.

12. In combination, a pen cap open at one end to receive a pen and having a longitudinal bore at the other end, a clip having a body extending over said bore outside the cap and engaging the edges of said bore, a neck on said body closely fitting the wall of said bore, and a sleeve within the barrel and having threaded engagement with said neck to hold the clip in place and having an edge adapted to engage the barrel end of a pen.

13. In combination, a pen cap open at one end to receive a pen and having a longitudinal bore at the other end, a clip having a body extending over said bore outside the cap and engaging the edges of said bore, a neck on said body closely fitting the wall of said bore, a sleeve within the barrel and having threaded engagement with said neck to hold the clip in place, and shoulders on said sleeve and on said cap adapted to engage each other to prevent movement of the clip body away from the cap and having an edge adapted to engage the barrel end of a pen.

14. In combination, a pen cap formed of a length of tubing, a clip having a body extending across one end of the tubing to close it, a sleeve rotatably mounted within the cap and having threaded engagement with the body of the clip, and shoulders on said sleeve and on said cap adapted to engage each other to prevent movement of the clip body away from the cap.

15. A fountain pen clip having a shank adapted to extend generally parallel to the length of a fountain pen cap to which it may be secured, said shank being secured to a body adapted to extend across the end of such cap and said body having a threaded portion extending substantially coaxially of such cap, for the purpose set forth.

GABRIEL LARSEN.